United States Patent [19]
Wilson

[11] 3,747,867
[45] July 24, 1973

[54] REEL HUB LATCH

[75] Inventor: John H. Wilson, Tulsa, Okla.
[73] Assignee: Telex Computer Products, Inc., Tulsa, Okla.

[22] Filed: Nov. 17, 1971
[21] Appl. No.: 199,560

[52] U.S. Cl. .............................. 242/68.3, 24/208 A
[51] Int. Cl. .............................. B65h 17/02
[58] Field of Search .................... 242/68.3, 72, 72.1; 24/208 A, 73 P, 73 D

[56] References Cited

UNITED STATES PATENTS

| | | | |
|---|---|---|---|
| 3,405,881 | 10/1968 | Sonford | 242/68.3 |
| 3,544,027 | 12/1970 | Green | 242/68.3 |
| 3,366,343 | 1/1968 | Messamer | 242/68.3 |
| 3,307,797 | 3/1967 | McFeaters | 242/68.3 |
| 2,998,206 | 8/1961 | Pendleton | 242/68.3 X |

*Primary Examiner*—George F. Mautz
*Assistant Examiner*—Edward J. McCarthy
*Attorney*—Head & Johnson

[57] ABSTRACT

This invention describes a simple, inexpensive and effective latch for magnetic tape reels. It involves three parts: the first is a flange or table which can be attached to a motor shaft and on which the tape reel is positioned; the second is a shallow cup coaxially mounted on the table with a short cylindrical wall of diameter slightly less than the inner diameter of the tape reel which will be placed on the table, the outer wall of said cup outwardly expansible; the third part is an operating member which comprises a central knob which is attached to a conical portion at its small end, the conical portion, at its wide end, connected to a short cylinder which fits inside of the cup wall.

When the knob is pressed inwardly the conical section expands at its wide end, tending to take a planar shape. As it does so, it presses radially outwardly through the cylinder against the cup wall, which is forced outwardly into intimate frictional contact with the inside of the tape reel.

This magnetic tape reel latch is adaptable to pneumatic as well as manual operation.

10 Claims, 5 Drawing Figures

REEL HUB LATCH

BACKGROUND OF THE INVENTION

This invention relates to magnetic tape transport devices. More specifically, it is concerned with a latch mechanism by means of which a tape reel can be positioned on, and held tightly to, a table which is driven by a motor.

DESCRIPTION OF THE PRIOR ART

In the prior art there are a great number of different designs and types of latching means for magnetic tape reels. Some of these are extremely complex and expensive, others are simpler. All or most of them, in one way or another, provide a cylindrical surface with a friction-driving outer surface, about which the hub of the tape reel is placed. There is some mechanism, either by toggle action or by screw action, or by pneumatic force, that presses this frictional surface radially outward to grasp and hold the hub. Most, if not all, of these mechanisms have a great number of parts, all of which are expensive to construct and to maintain.

It is required in the operation of these tape transport units that the tape reel will be rapidly mountable and demountable, that the tape reel be held precisely centrally on the table, and that there be sufficient frictional contact between the reel and the table so that under the very rapid accelerations and decelerations of the table there will be no slippage between the reel and the table.

SUMMARY OF THE INVENTION

The object of the present invention is to provide an improved reel support for fastening tape reel in a firm, frictional-driving relation which features a rapid reel changing facility. A further object of the present invention is to provide an improved reel support which is characterized by simplicity of construction and operation and which can be used with any standard tape reel.

The method of this invention is unique in that it requires only two parts in addition to the reel table. One of these is a shallow cup formed of an annular disc with a short circumferential cylindrical wall attached at its periphery. The method of attachment is by means of a thin-walled, narrow, flexible circumferential ribbon. This cup is molded of a flexible elastomeric material and is adapted to be pressed outwardly against the inside of the hub aperture of a tape reel.

Fitted inside of this shallow cup is an operating member which comprises a knob which is attached to the small front end of a truncated cone by flexible means. The method of attachment is by means of a circumferential, thin-walled, narrow, flexible ribbon. At the wide large end of the conical portion is another short cylinder which is again attached by means of a thin flexible ribbon, the second cylinder is adapted to fit inside of the cup wall.

The geometry is arranged such that as the knob is pressed inwardly toward the reel the conical portion tends to expand at its wide end and to press outwardly against the cup wall, which forces it outwardly into intimate friction-driving contact with the inside surface of the tape reel. By pressing the knob far enough the conical portion will become planar in shape, and by going still farther, it will become a reverse cone and will be locked in position by toggle action. Therefore, it is not necessary to provide a continuing force on the knob. When the tape reel is to be released the knob is pulled, forming the operating member into a cone again of smaller diameter, and permitting the cup wall to reduce to its original diameter and thereby to free the hub.

BRIEF DESCRIPTION OF THE DRAWINGS

These and other objects of this invention and a better understanding of the principles and details of the invention will be evident from the following description taken in conjunction with the appended drawings, in which.

DESCRIPTION OF THE PREFERRED EMBODIMENTS

Figure 1:
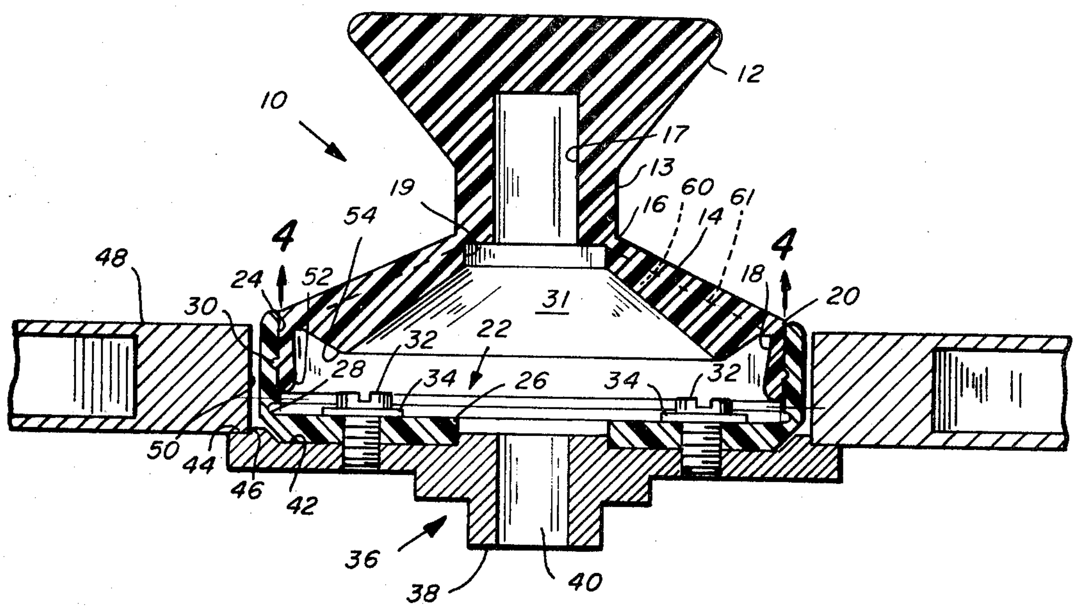
FIGS. 1 and 2 show in elevational section, one embodiment of this invention in the unclamped and in the clamped condition.
Figure 2:
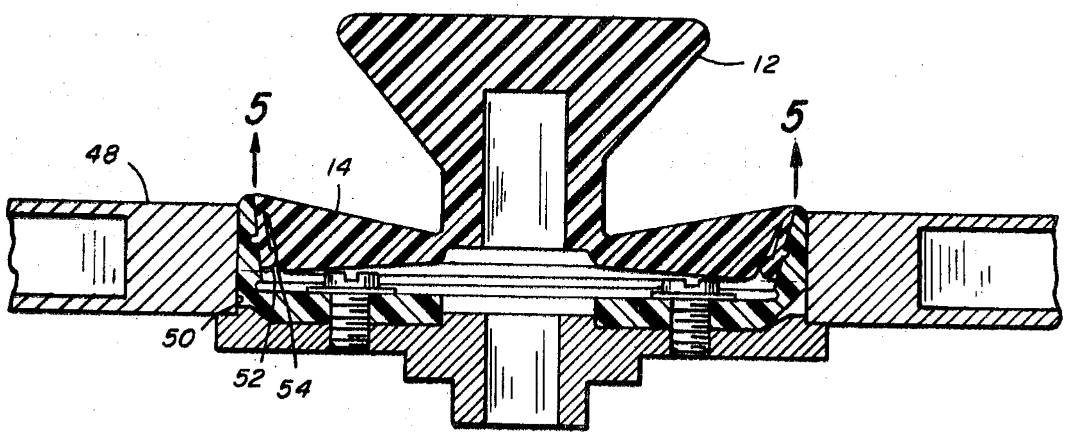

Referring now to the drawings and in particular to FIGS. 1 and 2 there are shown in cross-section, two views of one embodiment of this invention. In FIG. 1 the latch is unlatched and the tape reel is in position to be placed on or taken off the reel table. In FIG. 2 the latch is clamped tight, holding the reel to the table.

The latch assembly is made in three parts. The first is an operating portion or member indicated generally by the numeral 10. The second is a cup portion indicated generally by the numeral 22. The third is a reel table portion, indicated generally by the numeral 36.

The table 36 comprises a hub 38 with a central axial opening 40 for attachment to the shaft of a motor which is to drive the reel. On the outer edge of the front face of the table (opposite to the hub) there is a seat prepared for a reel hub which is indicated by the numeral 48. This seat comprises a planar portion 44 which engages the side of the reel hub and a shoulder 46 which engages and positions the internal aperture or opening in the reel hub. The inner diameter of the reel hub is a standard dimension of all reels.

Mounted on the front face 42 of the reel table is a shallow cup 22 formed of an annular disc 26 with a short cylindrical wall 24 fastened circumferentially to the outer perimeter of the disc at 28. The method of fastening is a flexible hinge-like device which incorporates a thin-walled, narrow, flexible ribbon which is intimately fastened to the disc and to the wall.

This construction is best carried out by molding this cup in a flexible type plastic, such as polyurethane, so that by making the hinge part 28 long enough and thin enough there will be sufficient flexibility and stretch in that region, that when there is internal pressure on the wall 24, it will expand outwardly and engage in frictional contact the inner surface of the central opening in the reel hub.

In operation, the wall 24 is pressed outwardly by the operating member 10. This comprises a central knob 12 which has a cylindrical portion 13 which is attached to the truncated top small end of a conical portion 14 by means of a flexible hinge 16 similar to numeral 28 of the cup 22. At the large end of the conical portion is a short cylinder 18, which at one edge is hinged to the conical portion at 20, by means of a similar type of hinge as at 28. The conical portion 14 has a thick section for the purpose of providing reasonably rigid means to press downwardly and radially outwardly against the cylinder 18. However, as is shown in connection with FIGS. 4 and 5, since there must be expansion in all directions as the operating element is pressed downwardly, there are radial slits on the inside of the conical portion, indicated by numeral 60, leaving a plurality of thin portions which, when the element is operated, will stretch and permit the expansion required.

In the relaxed position shown, there is a notch near the outer edge of the conical portion with two shoulders 52 and 54 which are spread some distance apart.

The cup 22 is fastened to the table web 42 by means such as the screws 32 and washers 34. Conversely the annular disc 26 can be held down by means of an annular plate or a complete circular plate which is pressed down on it in the same manner that the washers 34 are used with one or more screws to hold the plate in position on the table. The cup, of course, can have a full circular base instead of an annular base, as desired.

The cup with its wall 24 and the operating element with its cylinder 18 are in a cooperative arrangement, whereby they move radially, one with the other. It is important that they be latched together so that in the pulling and pushing of the knob 12 there will be no relative longitudinal movement. Therefore it is desirable to mold into the matching surfaces of the cylinder and the cup a ridge or guide, such as 30, which will hold the two together in a longitudinal direction.

Referring now to FIG. 2, the action of the reel latch will be described in the locking position. As the knob 12 is pushed down toward the table the conical portion 14, which in effect comprises a plurality of conical compression elements, press downwardly and radially outwardly through the hinge 20 against the cylinder 18. The cylinder 18 presses against the cup 24, which presses outwardly into frictional-driving contact with the inner surface of the reel hub 50. Furthermore the two shoulders 52 and 54 are so designed that as the cone is pressed in and it changes to a flatter and wider conical angle, the shoulders 52 and 54 come into contact so that the radial outward pressure is provided not only at the hinge section 20 but also between these circular shoulders 52 and 54 so that there is radial outward pressure over essentially the whole surface of the cylinder 18. This is indicated in a general way in FIG. 2 where the notch formed by the two shoulders 52, 54 is essentially closed and there is high pressure contact at the end 20 and at the shoulders 52, 54.

To unlatch the tape reel, all that is necessary is to pull the knob 12 outward, forming again the normal conical surface 14 and permitting the cylinder 18 and wall 24 to reduce in diameter to a value less than D, and to clear the inner surface 50 of the reel hub.

It will be clear that instead of pushing the knob in by hand, it would be possible to apply a vacuum through the opening 40 such as through a hole bored in the shaft of the motor which is fastened to the hub 38. The vacuum inside the space 31 formed by the cup and the operating element will provide partial atmospheric pressure on the outer surface of the conical portion causing it to be pressed inward, and to lock the tape reel.

Figure 3:
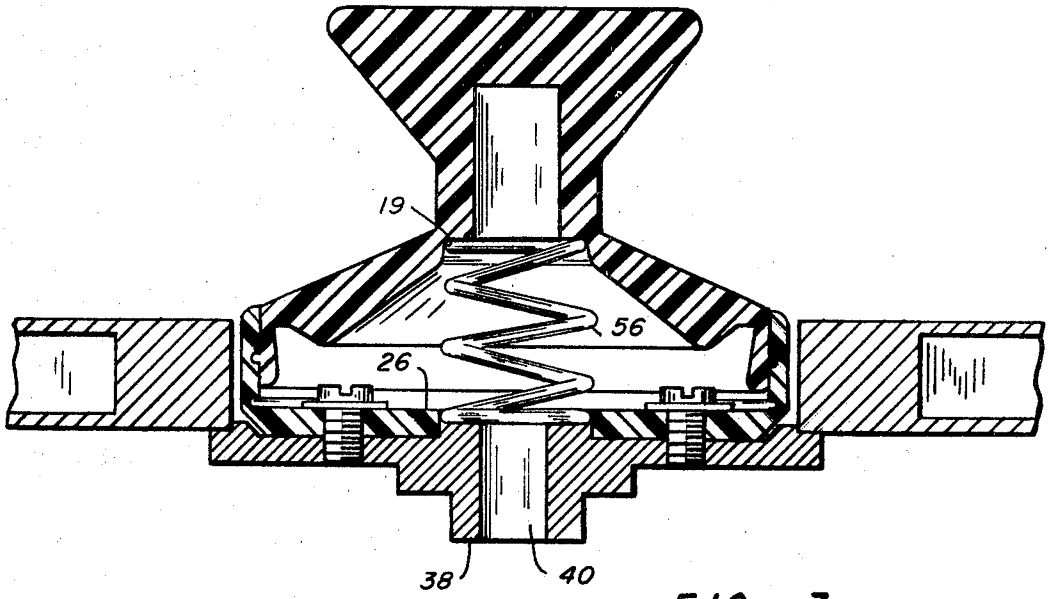
FIG. 3 shows a vertical section of another embodiment of the invention which utilizes vacuum means to clamp the latch against the reel hub.

In FIG. 3 is shown another view of FIG. 1 with the addition of a helical wire spring 56 which is fitted into the cylindrical notch 19 at the top and inside the central opening of the annular disc 26. The purpose of the spring is to assist the unlocking of the latch when the vacuum is removed and atmospheric pressure is applied to the space 31 inside the cup. Although the compressed spring is not shown in FIG. 2 it will be readily understood how it will fit into the space which remains clear between the openings inside 19 and 26.

Figures 4, 5:
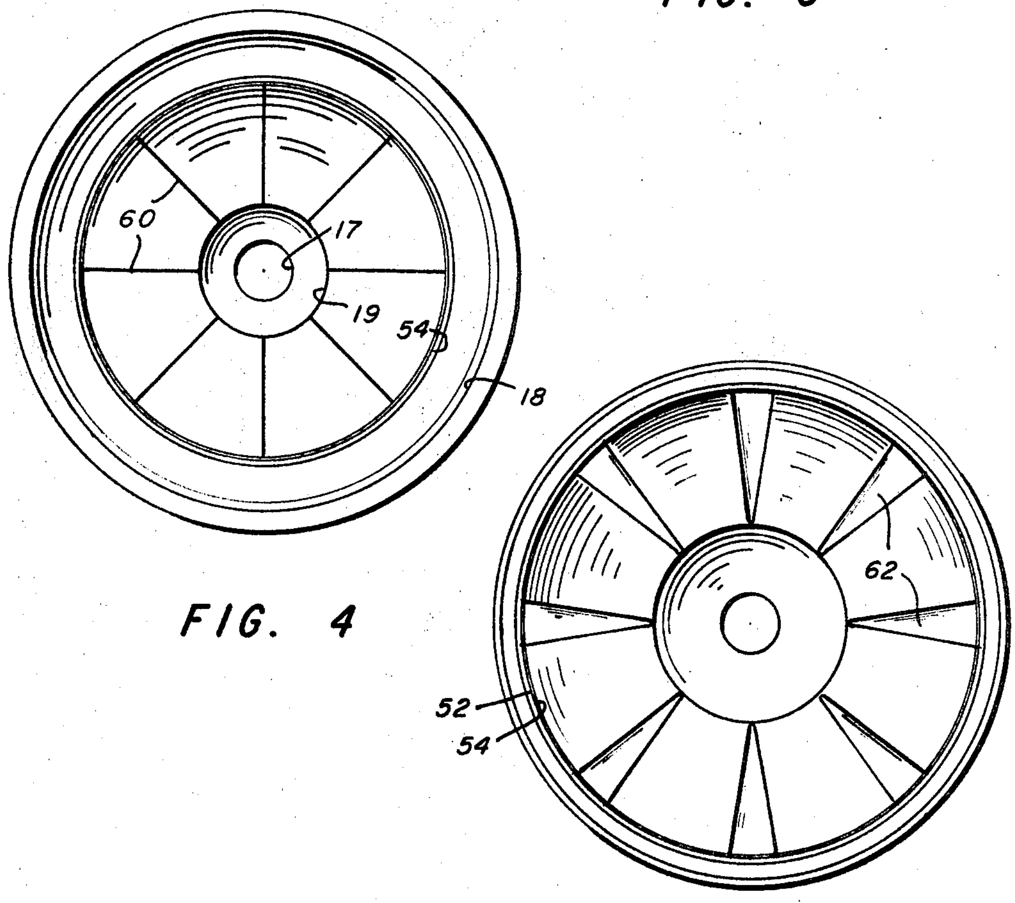
FIGS. 4 and 5 illustrate some details of the structure of the embodiment of FIGS. 1, 2 and 3.

In FIG. 4 is shown, in very schematic fashion a view of FIG. 1 taken along line 4—4. FIG. 5 represents the same view taken in the operating position, according to the line 5—5 of FIG. 2. As the knob is pressed in, the conical portion 14 and particularly, the cylindrical portion 18 must expand to a greater diameter, and also to a greater perimeter. The diameter can be taken care of because of the geometry of the angle of the cone, however, the perimeter is a problem and for this purpose the undersurface of the conical portion is slotted with a plurality of radial slots 60 which go part way through the conical portion, leaving a minimum web 61, which is sufficiently thin to provide enough stretch to take care of the increase in lateral perimeter. In the unclamped position shown in FIG. 4 of the slots 60 are almost fully closed, however, when the reel is clamped and the cylinder 18 and cup 24 are expanded outwardly, the slots 60 are formed into angular cavities 62 by stretching of the web 61.

The real convenience and simplicity of this invention is based upon the use of single plastic moldings which can, in effect, combine a multitude of individual operating elements, cooperating with each other, to provide a complex total assembly. However, by designing each of these parts, that is, the elastic parts, the stiff parts and the expanding parts and the frictional parts, etc. in the proper way so that a single elastomeric compound can be used, even though it may be one that must be specially compounded, then with this simple single molded part it is possible to do away with tens or more of separate parts that must be constructed and meticulously fitted together. It has been found that polyurethane has enough rigidity, enough flexibility with thin enough section, enough stretch and enough frictional coefficient to serve ideally for this application. While this invention is not limited to using polyurethane it is the pre-ferred material. Furthermore, just as it was possible to vary the isotropic properties of the operating element by judicious changes in section, etc., the same design can be applied to the cup so that the wall 24 will have adequare freedom to expand outwardly and provide the necessary frictional contact with the reel drums.

While the invention has been described with a certain degree of particularity it is manifest that many changes may be made in the details of construction and the arrangement of components. It is understood that the invention is not to be limited to the specific embodiments set forth herein by way of exemplifying the invention but the invention is to be limited only by the scope of the attached claim or claims, including the full range of equivalency to each element or step thereof is entitled.

What is claimed:

1. A reel hub latch for a magnetic tape transport, comprising:

a. a tape reel table having a reel flange receiving surface with an inside diameter equal to the inner diameter of a tape reel, means for mounting said table on a drive shaft;
b. shallow cup means formed with an annular disc portion and a short circumferential cylindrical wall of diameter less than the inner diameter of said tape reel, mounted coaxially on said table, said wall expansible to a diameter greater than the inner diameter of said tape reel;

c. operating means comprising a knob, a truncated conical portion attached at its small end to said knob by flexible means, and a short thin cylinder connected by flexible means to the large end of the conical portion, said cylinder adapted to snugly fit the inside of said cup wall;

whereby when a reel is placed on said table and said operating means is inserted into said cup, and said knob pressed inwardly, said conical portion will expand outwardly at its large end, pressing said cylinder and said wall radially outwardly and clamping said wall against the inner surface of said hub in frictional engagement.

2. The reel hub latch as in claim 1 including means for locking said cylinder inside said wall.

3. The reel hub latch as in claim 1 including means to press said knob inwardly beyond the position where said conical portion forms substantially a planar surface;

whereby said knob will be locked in position by toggle action.

4. The reel hub latch as in claim 1 including means to apply a partial vacuum to the space inside said cup and said operating means.

5. The reel hub latch as in claim 4 including compliant means inside said space inside said cup and said operating means tending to apply a longitudinal force to said knob pressing it outwardly.

6. The reel hub latch as in claim 1 in which said disc and said wall of said cup are fastened together by means of a thin flexible ribbon.

7. The reel hub latch as in claim 1 in which said knob and said cylinder are fastened to said conical portion by means of thin flexible ribbons.

8. The reel hub latch as in claim 1 in which said cup means and said operating means are molded of an elastomeric material.

9. The reel hub latch as in claim 8 in which said elastomeric material is polyurethane.

10. The reel hub latch as in claim 1 in which said operating means includes a plurality of radial cuts in the inside surface of said conical portion.

* * * * *